(12) United States Patent
Kennedy

(10) Patent No.: US 11,418,470 B2
(45) Date of Patent: *Aug. 16, 2022

(54) DISPLAYING CUSTOMIZED ELECTRONIC MESSAGING GRAPHICS

(71) Applicant: Snap Inc., Santa Monica, CA (US)

(72) Inventor: David James Kennedy, Toronto (CA)

(73) Assignee: Snap Inc., Santa Monica, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/086,019

(22) Filed: Oct. 30, 2020

(65) Prior Publication Data

US 2021/0119949 A1 Apr. 22, 2021

Related U.S. Application Data

(63) Continuation of application No. 16/128,079, filed on Sep. 11, 2018, now Pat. No. 10,848,446, which is a (Continued)

(51) Int. Cl.
*G06F 17/00* (2019.01)
*H04L 51/10* (2022.01)
(Continued)

(52) U.S. Cl.
CPC ............ *H04L 51/10* (2013.01); *G06F 3/0481* (2013.01); *G06F 40/20* (2020.01); *G06K 9/00* (2013.01);
(Continued)

(58) Field of Classification Search
CPC ......... H04L 51/10; H04L 51/32; H04L 51/04; H04L 67/02; H04L 51/20; H04W 4/02;
(Continued)

(56) References Cited

U.S. PATENT DOCUMENTS 5,880,731 A 3/1999 Liles et al.
6,023,270 A 2/2000 Brush, II et al.
(Continued)

FOREIGN PATENT DOCUMENTS

CA 2887596 A1 7/2015
CN 1842005 10/2006
(Continued)

OTHER PUBLICATIONS

"Korean Application Serial No. 10-2020-7029636, Response filed Dec. 29, 20 to Notice of Preliminary Rejection dated Nov. 2, 2020", w/ English Translation, 12 pgs.
(Continued)

*Primary Examiner* — Hassan Mrabi
(74) *Attorney, Agent, or Firm* — Schwegman Lundberg & Woessner, P.A.

(57) ABSTRACT

A system according to various exemplary embodiments includes a processor and a user interface coupled to the processor, the user interface comprising an input device and a display screen. The system further comprises memory coupled to the processor and storing instructions that, when executed by the processor, cause the system to perform operations comprising: receiving, via the input device of the user interface, an electronic message comprising a scene identifier for a graphic; retrieving a user identifier for a user associated with the system; generating a customized graphic based on the scene identifier and the user identifier; and presenting the customized graphic within the electronic message via the display screen of the user interface.

20 Claims, 9 Drawing Sheets

Related U.S. Application Data continuation of application No. 15/290,941, filed on Oct. 11, 2016, now Pat. No. 10,855,632.

(60) Provisional application No. 62/364,190, filed on Jul. 19, 2016.

(51) Int. Cl.

| | | |
|---|---|---|
| *H04W 4/02* | (2018.01) | |
| *H04W 4/12* | (2009.01) | |
| *G06T 11/00* | (2006.01) | |
| *G06K 9/00* | (2022.01) | |
| *G06F 40/20* | (2020.01) | |
| *G06V 40/16* | (2022.01) | |
| *G06F 3/0481* | (2022.01) | |
| *G06T 11/60* | (2006.01) | |
| *H04L 51/04* | (2022.01) | |
| *H04L 67/02* | (2022.01) | |
| *H04L 51/222* | (2022.01) | |
| *H04L 51/52* | (2022.01) | |
| *G06T 3/40* | (2006.01) | |

(52) U.S. Cl.
CPC .............. *G06T 11/00* (2013.01); *G06T 11/60* (2013.01); *G06V 40/174* (2022.01); *H04L 51/04* (2013.01); *H04L 51/20* (2013.01); *H04L 51/32* (2013.01); *H04L 67/02* (2013.01); *H04W 4/02* (2013.01); *H04W 4/12* (2013.01); *G06T 3/40* (2013.01)

(58) Field of Classification Search
CPC . H04W 4/12; G06T 11/60; G06T 3/40; G06K 9/00302; G06F 3/0481; G06F 40/20
See application file for complete search history.

(56) References Cited

U.S. PATENT DOCUMENTS

| | | |
|---|---|---|
| 6,038,295 A | 3/2000 | Mattes |
| 6,223,165 B1 | 4/2001 | Lauffer |
| 6,772,195 B1 | 8/2004 | Hatlelid et al. |
| 6,842,779 B1 | 1/2005 | Nishizawa |
| 6,980,909 B2 | 12/2005 | Root et al. |
| 7,173,651 B1 | 2/2007 | Knowles |
| 7,342,587 B2 | 3/2008 | Danzig et al. |
| 7,411,493 B2 | 8/2008 | Smith |
| 7,468,729 B1 | 12/2008 | Levinson |
| 7,535,890 B2 | 5/2009 | Rojas |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,199,747 B2 | 6/2012 | Rojas et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,086,776 B2 | 7/2015 | Ye et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,191,776 B2 | 11/2015 | Root et al. |
| 9,204,252 B2 | 12/2015 | Root |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,443,227 B2 | 9/2016 | Evans et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |

(56) References Cited

U.S. PATENT DOCUMENTS

| | | |
|---|---|---|
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,848,446 B1 | 11/2020 | Kennedy |
| 10,855,632 B2 | 12/2020 | Kennedy |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0202598 A1 | 8/2011 | Evans et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0209924 A1 | 8/2012 | Evans et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0040712 A1 | 2/2014 | Chang et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129322 A1 | 5/2014 | George et al. |
| 2014/0129343 A1 | 5/2014 | Finster et al. |
| 2014/0160149 A1* | 6/2014 | Blackstock ............ G06N 3/006 345/619 |
| 2015/0100647 A1 | 4/2015 | Agustin et al. |
| 2015/0154232 A1 | 6/2015 | Ovsjanikov et al. |
| 2015/0206349 A1 | 7/2015 | Rosenthal et al. |
| 2016/0134840 A1 | 5/2016 | Mcculloch |
| 2016/0142889 A1 | 5/2016 | O'connor et al. |
| 2016/0179967 A1* | 6/2016 | Sa .................. G06F 16/3346 707/730 |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0308290 A1* | 10/2017 | Patel .................. G06F 16/9535 |
| 2017/0310934 A1 | 10/2017 | Du et al. |
| 2017/0312634 A1 | 11/2017 | Ledoux et al. |
| 2017/0035801 A1 | 12/2017 | Montague et al. |
| 2018/0026925 A1 | 1/2018 | Kennedy |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2021/0044552 A1 | 2/2021 | Kennedy |

FOREIGN PATENT DOCUMENTS

| | | |
|---|---|---|
| CN | 104333688 | 2/2015 |
| CN | 104335607 | 2/2015 |
| CN | 109716264 A | 5/2019 |
| CN | 109863532 A | 6/2019 |
| CN | 110168478 A | 8/2019 |
| EP | 2184092 A2 | 5/2010 |
| JP | 2001230801 A | 8/2001 |
| JP | 5497931 B2 | 3/2014 |
| KR | 101445263 B1 | 9/2014 |
| KR | 102166159 B1 | 10/2020 |
| KR | 102168367 B1 | 10/2020 |
| KR | 102168522 B1 | 10/2020 |
| KR | 102168823 B1 | 10/2020 |
| KR | 102247348 | 5/2021 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018017728 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"Korean Application Serial No. 10-2021-7012626, Notice of Preliminary Rejection dated Jun. 28, 2021", w/ English Translation, 10 pgs.

"Chinese Application Serial No. 201780057353.7, Office Action dated Aug. 3, 2021", w/ English Translation, 13 pgs.

"U.S. Appl. No. 15/290,941, Final Office Action dated May 31, 2019", 15 pgs.

"U.S. Appl. No. 15/290,941, Non Final Office Action dated Jun. 14, 2018", 9 pgs.

"U.S. Appl. No. 15/290,941, Non Final Office Action dated Nov. 12, 2019", 17 pgs.

"U.S. Appl. No. 15/290,941, Notice of Allowance dated Apr. 2, 2020", 12 pgs.

"U.S. Appl. No. 15/290,941, Notice of Allowance dated Jul. 23, 2020", 8 pgs.

"U.S. Appl. No. 15/290,941, Response filed Mar. 3, 2020 to Non Final Office Action dated Nov. 12, 2019", 12 pgs.

"U.S. Appl. No. 15/290,941, Response filed Jul. 31, 2019 to Final Office Action dated May 31, 2019", 11 pgs.

"U.S. Appl. No. 15/290,941, Response filed Sep. 14, 2018 to Non Final Office Action dated Jun. 14, 2018", 10 pgs.

"U.S. Appl. No. 16/128,079, Non Final Office Action dated Nov. 12, 2019", 14 pgs.

"U.S. Appl. No. 16/128,079, Notice of Allowance dated Apr. 6, 2020", 12 pgs.

"U.S. Appl. No. 16/128,079, Notice of Allowance dated Jul. 23, 2020", 8 pgs.

"U.S. Appl. No. 16/128,079, Response filed Mar. 3, 20 to Non Final Office Action dated Nov. 12, 2019", 8 pgs.

"International Application Serial No. PCT/US2017/042883, International Preliminary Report on Patentability dated Jan. 31, 2019", 6 pgs.

(56) References Cited

OTHER PUBLICATIONS

"International Application Serial No. PCT/US2017/042883, International Search Report dated Sep. 27, 2017", 2 pgs.

"International Application Serial No. PCT/US2017/042883, Written Opinion dated Sep. 27, 2017", 4 pgs.

"Korean Application Serial No. 10-2019-7004463, Notice of Preliminary Rejection dated Apr. 24, 2020", w/ English translation, 8 pgs.

"Korean Application Serial No. 10-2019-7004463, Response filed Jun. 24, 2020 to Notice of Preliminary Rejection dated Apr. 24, 2020", w/ English Claims, 18 pgs.

"Korean Application Serial No. 10-2020-7003688, Notice of Preliminary Rejection dated Apr. 24, 2020", w/ English translation, 8 pgs.

"Korean Application Serial No. 10-2020-7003688, Response filed Jun. 24, 2020 to Notice of Preliminary Rejection dated Apr. 24, 2020", w/ English Claims, 16 pgs.

"Korean Application Serial No. 10-2020-7028760, Notice of Preliminary Rejection dated Nov. 2, 2020", w/ English translation, 8 pgs.

"Korean Application Serial No. 10-2020-7028760, Response filed Dec. 31, 2020 Notice of Preliminary Rejection dated Nov. 2, 2020", w/ English Claims, 17 pgs.

"Korean Application Serial No. 10-2020-7029636, Notice of Preliminary Rejection dated Nov. 2, 2020", w/ English Translation, 8 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

U.S. Appl. No. 15/290,941 U.S. Pat. No. 10,855,632, filed Oct. 11, 2016, Displaying Customized Electronic Messaging Graphics.

U.S. Appl. No. 16/128,079 U.S. Pat. No. 10,848,446, filed Sep. 11, 2018, Displaying Customized Electronic Messaging Graphics.

U.S. Appl. No. 17/082,965, filed Oct. 28, 2020, Displaying Customized Electronic Messaging Graphics.

"U.S. Appl. No. 17/082,965, Notice of Allowability dated Mar. 30, 2022", 2 pgs.

"Chinese Application Serial No. 201780057353.7, Office Action dated May 6, 2022", w/English Translation, 4 pgs.

"Korean Application Serial No. 10-2022-7013785, Notice of Preliminary Rejection dated May 27, 2022", W/English Translation, 9 pgs.

\* cited by examiner

DISPLAYING CUSTOMIZED ELECTRONIC MESSAGING GRAPHICS

CROSS-REFERENCE TO RELATED APPLICATION

This application is a continuation of U.S. patent application Ser. No. 16/128,079, filed on Sep. 11, 2018, which is a continuation of U.S. patent application Ser. No. 15/290,941, filed on Oct. 11, 2016, which claims the benefit of priority to U.S. Provisional Application Ser. No. 62/364,190, filed Jul. 19, 2016, each of which are incorporated by reference herein in their entireties.

BACKGROUND

The popularity of electronic messaging, particularly instant messaging, continues to grow. Users increasingly use "emoji" (which are ideograms and icons) within electronic messages such as texts and emails, reflecting a global demand to communicate more visually. However, conventional emoji and similar graphics are typically generic and lacking in diversity: every individual user is represented by the same set of faces, irrespective of appearance, gender or ethnicity. Furthermore, every conversation that uses conventional emoji looks identical, and there is no visual personality or cue to identify the participants or distinguish one interaction from the next. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by generating and displaying customized graphics within electronic messages. The custom graphic may be generated based on a user identifier and one or more scene identifiers. For example, a user may input one or more conventional emoji, text, and other input within an electronic message (such as an SMS text or email) and the system will generate the custom graphic within the electronic message, replacing the input. The customized image may be sized based on the position of the input within the message, allowing smaller or larger images to automatically be generated and presented to the user.

In some embodiments, customized graphics may be generated and presented within an electronic message based on sensor information retrieved from the sensor component(s) of a mobile device, such as location information, motion information, light levels, temperature, and the Like. The customized graphic may also be generated based on information regarding a user retrieved from a social network, and/or information regarding the user's mood. The customized graphics can be generated using such information along with a personalized avatar for the user (as well as the user's friends). For example, the system may determine from calendar information and geolocation information that the user is enjoying a birthday celebration with two of the user's friends at an Italian restaurant, and generate a graphic showing smiling avatars of the three friends sharing an oversized bowl of pasta, in another example, the system may determine from a user's previous electronic messages and social media posts that the user is currently at home with the flu, and generate a custom graphic showing an unhappy avatar of the user laying in bed with a box of tissues and a thermometer in his/her mouth. In this context, an "avatar" may include any image resembling (or otherwise associated with) the user. Among other things, using user-associated avatars by the embodiments of the present disclosure provide a level of personalization to electronic messages that is simply not possible with conventional UNICODE emoji or other standard characters.

Figure 1:
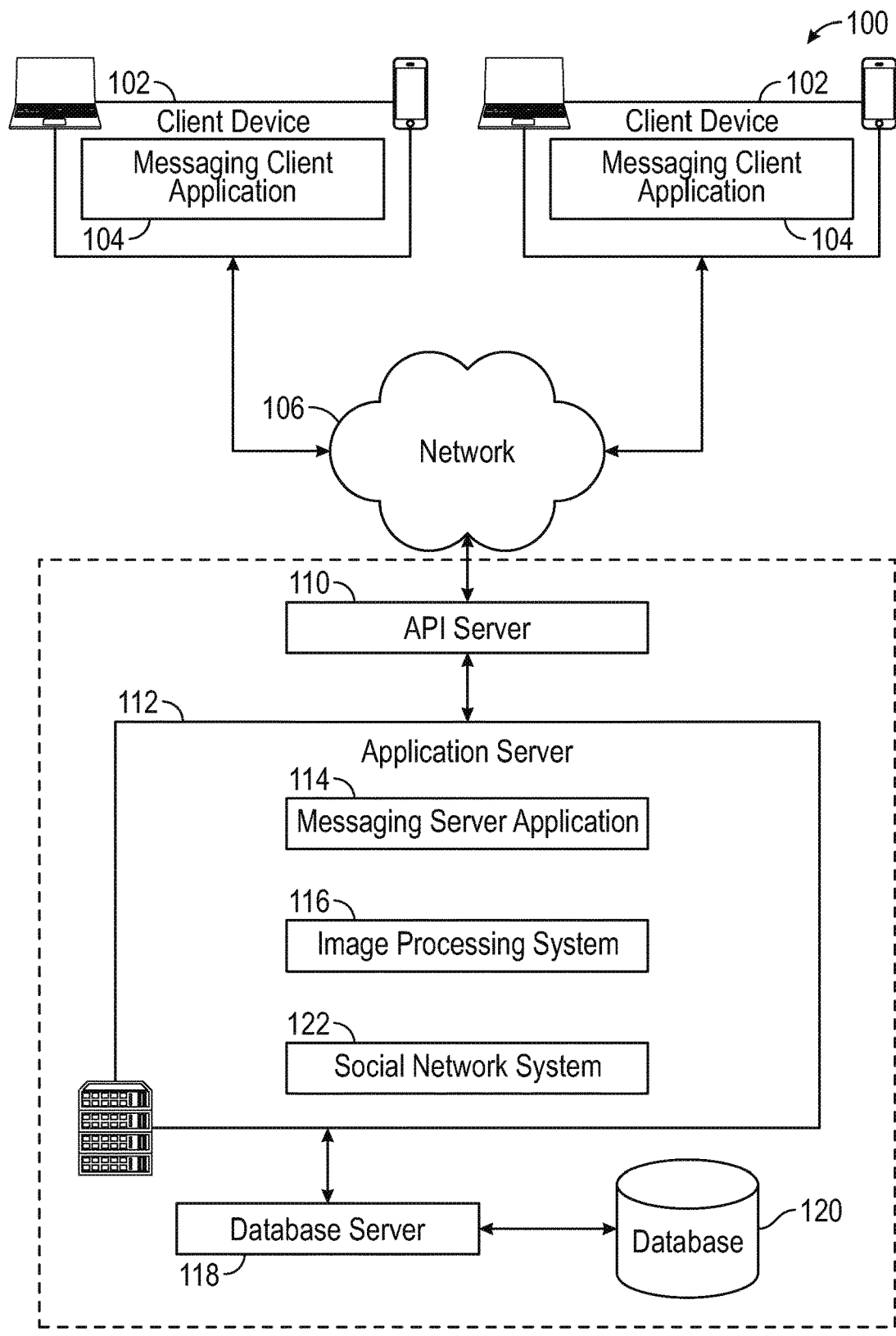
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122. supports various social networking functions services, and makes these functions and services available to the messaging server application 114. To this end, the social network system 122. maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, and/or any other wearable devices.

Figure 2:
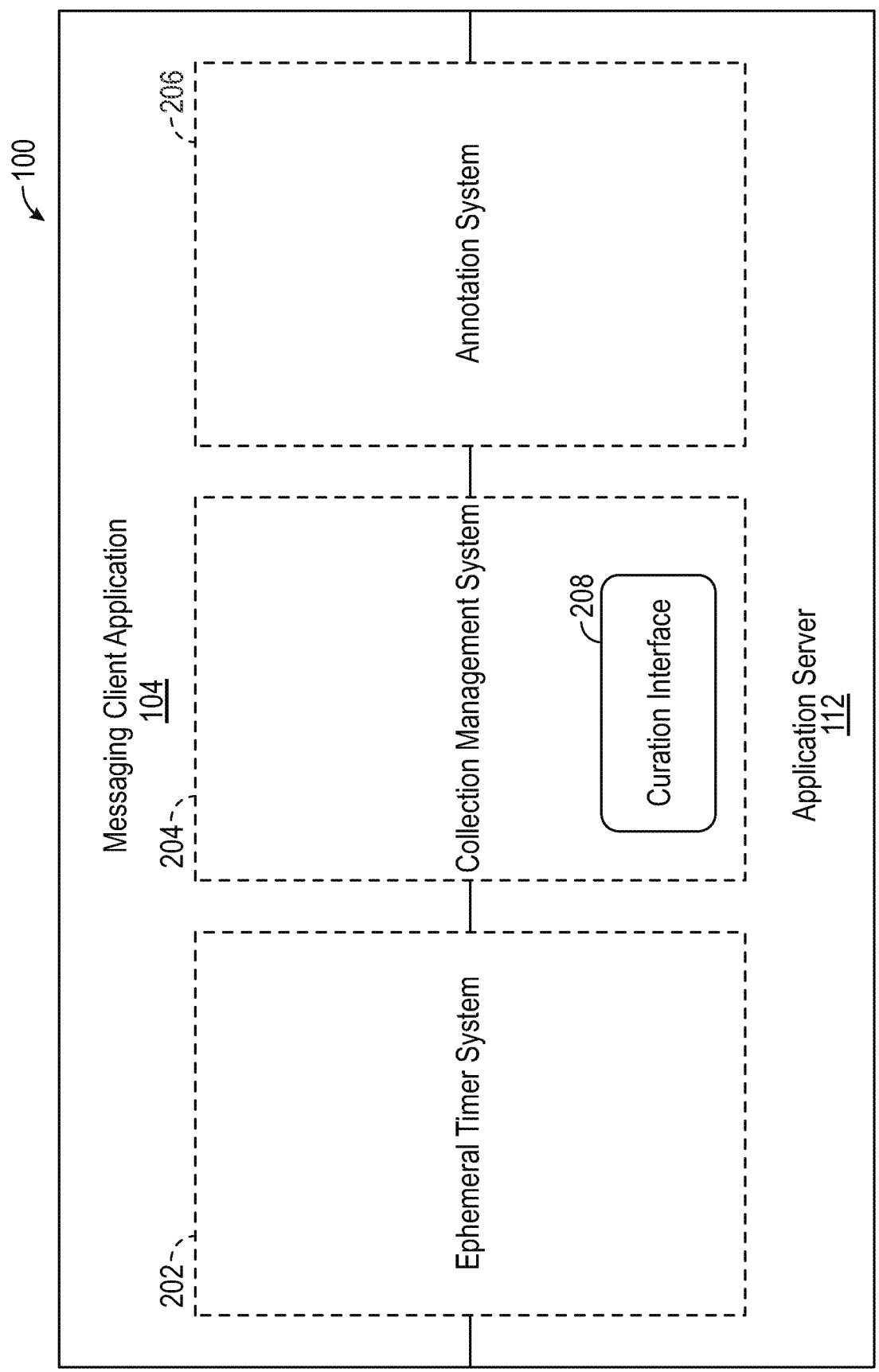
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral tinier system 202 incorporates a number of timers that, based on duration and display parameters associated with a message, or collection of messages (e.g., a SNAPCHAT story), selectively display and enable access to messages and associated content via the messaging client application 104.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102, The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
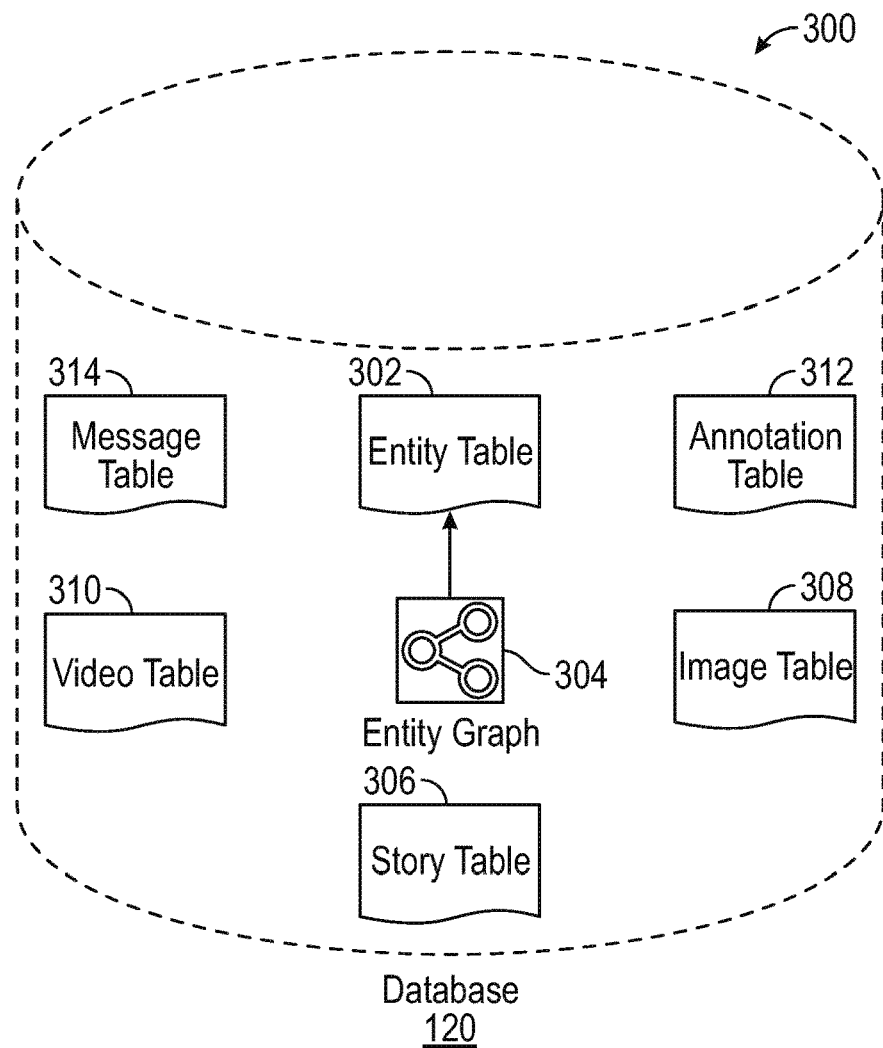
FIG. 3 is a schematic diagram illustrating data which may be stored in the database of the messaging server system, according to various exemplary embodiments.

In another exemplary embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schema diagram 300 illustrating data 300 which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. in some embodiments, a contribution to a location story may require a second degree of authentication to verify that the end user belongs to a specific organization or other entity (e.g., is a student on the university campus).

Embodiments of the present disclosure may generate and present customized images for use within electronic messages such as SMS or AIMS texts and emails. The customized images may also be utilized in conjunction with the SNAPCHAT stories, SNAPCHAT filters, and ephemeral messaging functionality discussed herein.

Figure 4A:
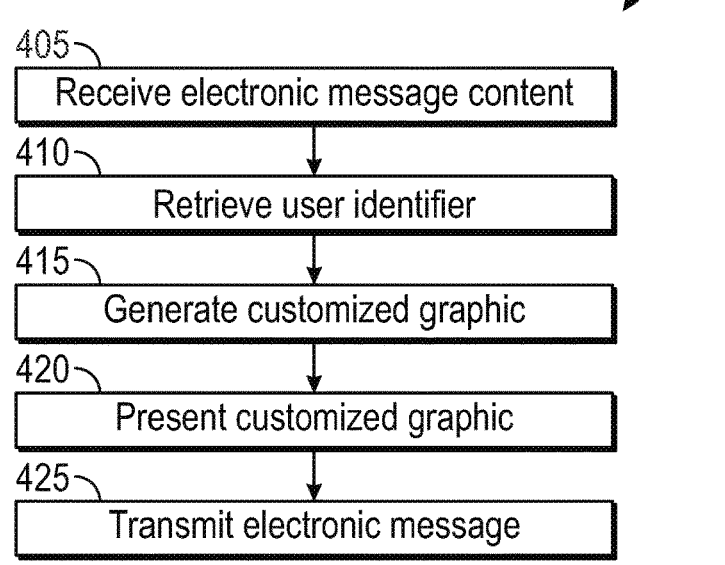
FIGS. 4A and 4B are exemplary flow diagrams of processes according to various aspects of the disclosure.

FIG. 4A depicts an exemplary process according to various aspects of the present disclosure. In this example, method 400 includes receiving content for an electronic message (405), retrieving a user identifier (410), generating a customized graphic based on the electronic message content and the user identifier (415), presenting the customized graphic (420), and transmitting an electronic message containing the customized graphic (425). The steps of method 400 may be performed in whole or in part, may be performed in conjunction with some or all of the steps in other methods (such as method 430 in FIG. 413), and may be performed by any number of different systems, such as the systems described in FIGS. 1 and/or 7.

Figure 5A:
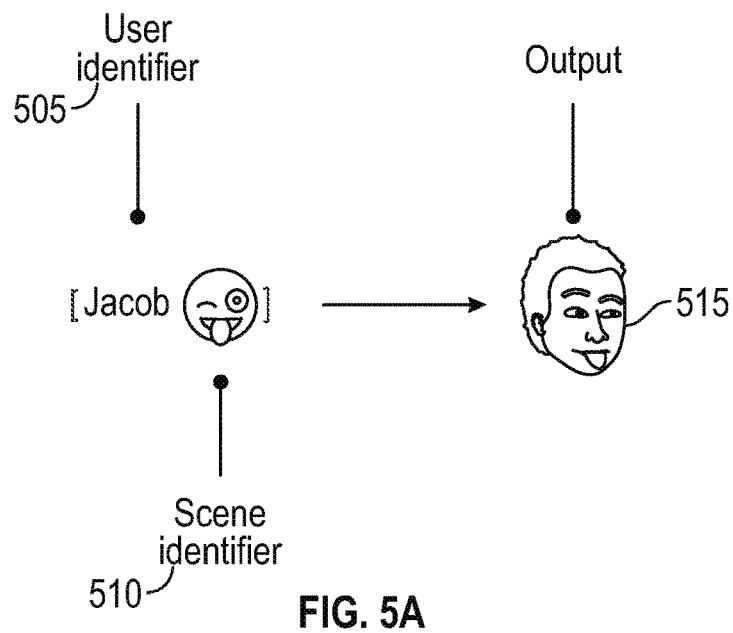
FIGS. 5A-5F are screenshots illustrating the steps of the methods described in FIGS. 4A-4B.

In some embodiments, customized graphics may be generated to replace or supplement emoji characters/icons defined by the UNICODE standard. For example, referring to FIG. 5A, a scene identifier 510 (the emoji character) is retrieved (405) in conjunction with retrieving (410) a user identifier ("jacob") 505 based on content for an electronic message entered by a user (e.g., via an input device). Based on the user identifier 505 and the scene identifier 510, the system generates (415) a custom graphic 515. In this example, the custom graphic 515 is a personalized avatar of the user mimicking the winking, tongue-extended emoji in the scene identifier 510. As used herein, an "electronic message" may refer to any message in electronic form, such as an email, a short message service (SMS) message, a multimedia message service (MMS) message, an instant message (IM), Internet Relay Chat (IRC) messages, as well as any other form of real-time, near-real-time, synchronous, or asynchronous electronic messaging format.

Figure 5B:
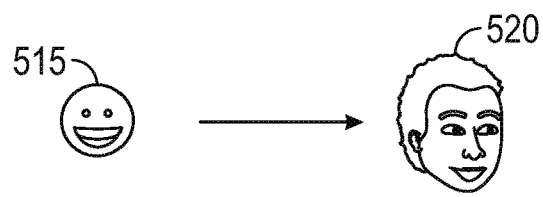
Figure 5C:
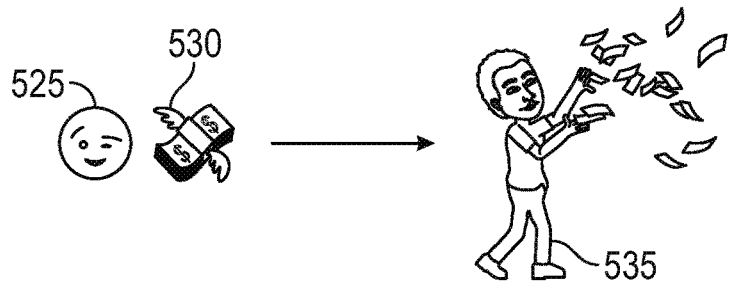
Figure 5D:
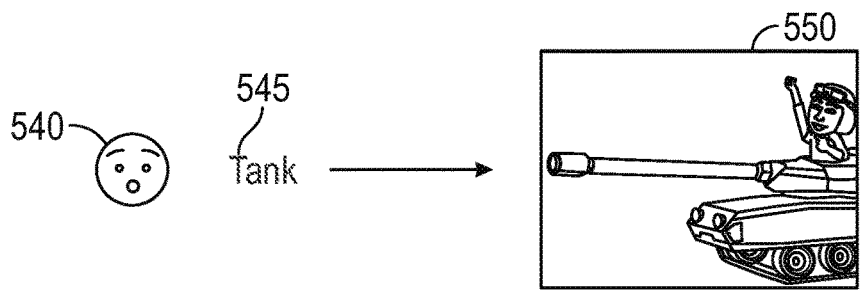
Figure 5E:
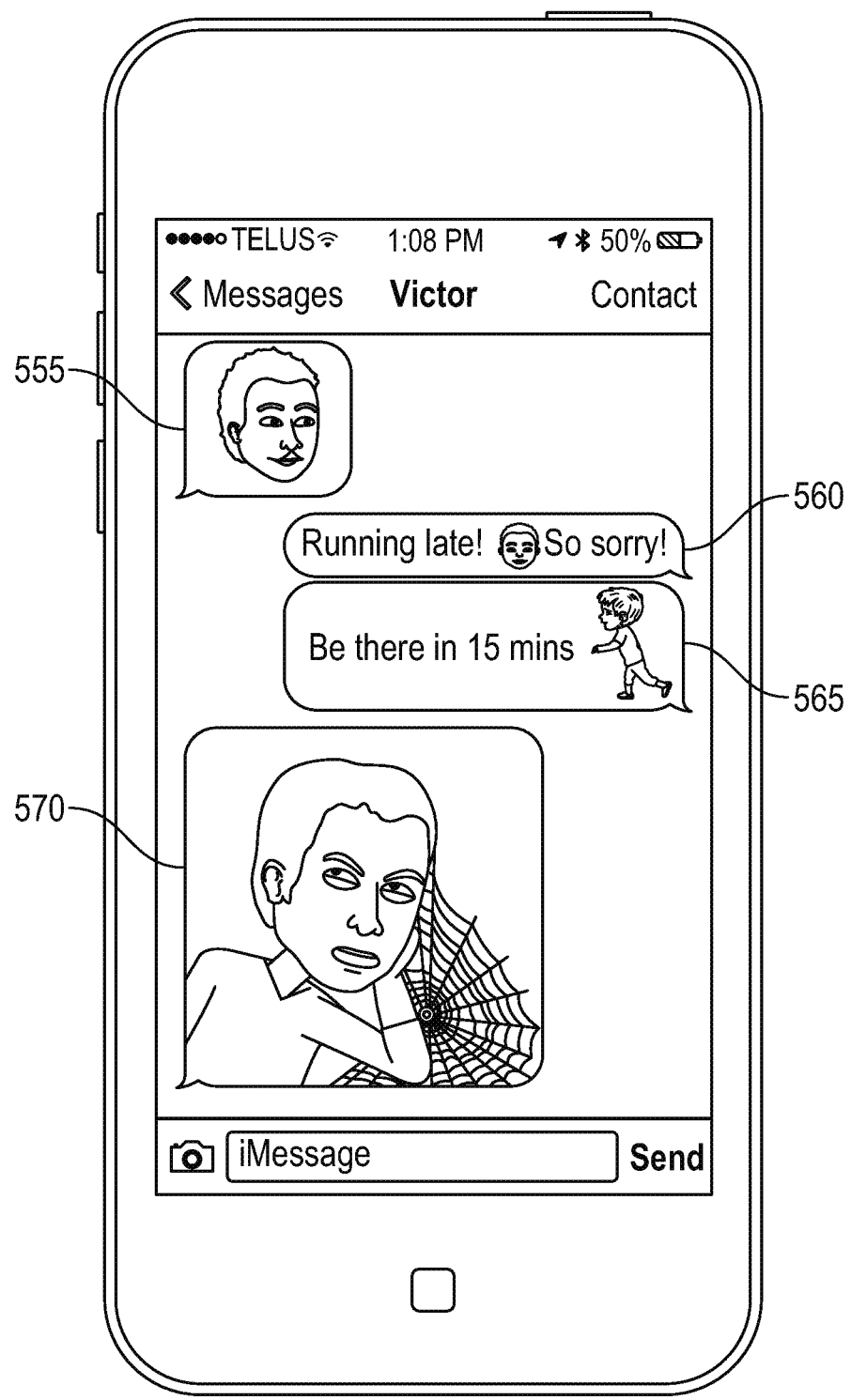
Figure 5F:
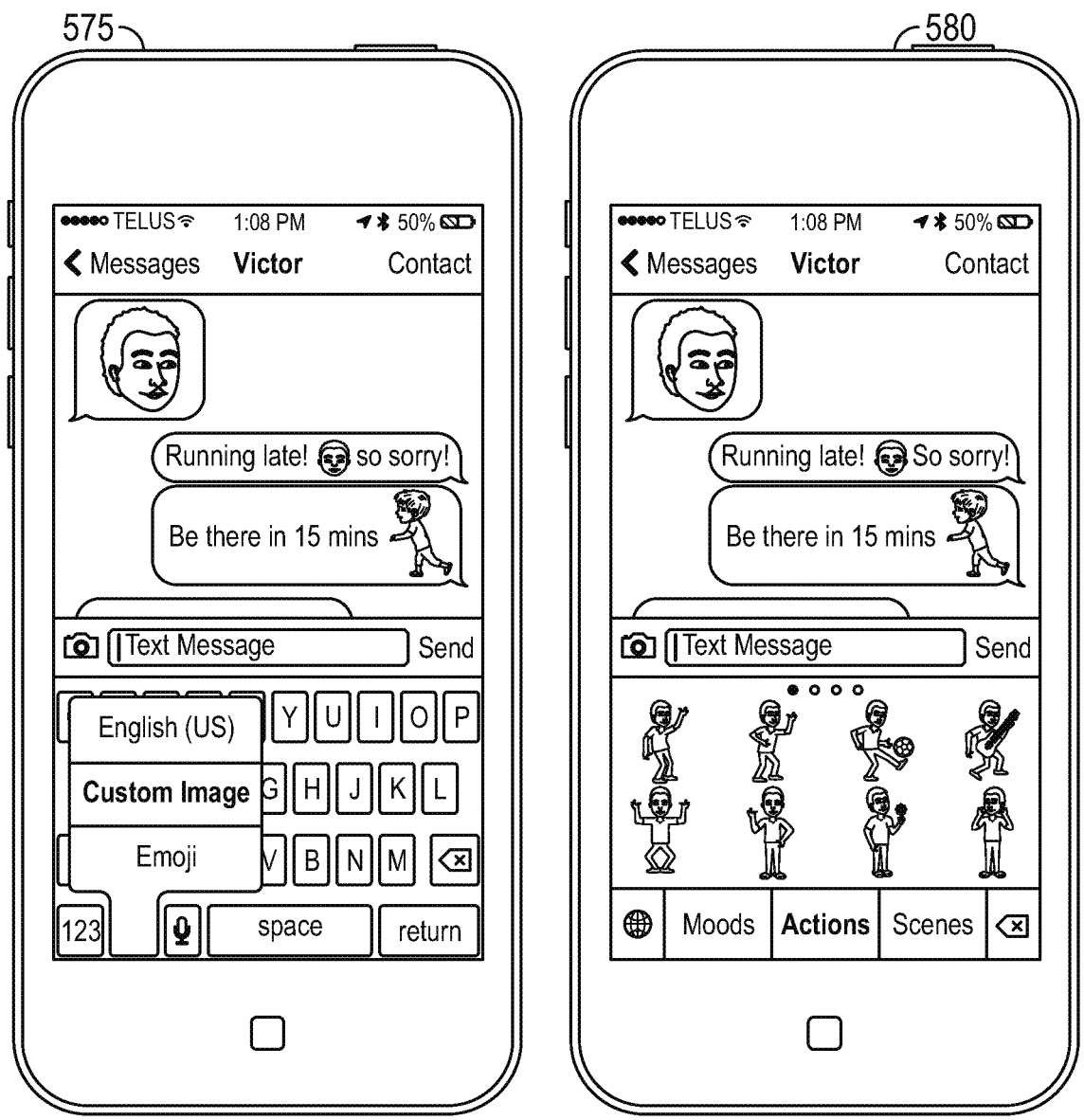

In some embodiments, the custom graphic 515 is pre-generated and presented (425) in a menu of graphics, such as shown at the bottom of the screenshot 580 in FIG. 5F. Additionally or alternatively, the custom graphic 515 can be generated (415) in real-time or near-real time in response to a user's input in an electronic message. For example, the user's input of UNICODE characters (such as emoji) and/or text can be used to generate a custom graphic that replaces the user's input within the text message. For example, referring to FIG. 5B, the system may retrieve (405), from the user's input into an electronic message, a smiling face emoji scene identifier 515, automatically retrieve a user identifier (410) stored in the device the user is using to input the message, and generate (415) the customized graphic of the user's avatar smiling 520, which may be presented in the electronic message instead of the original generic UNICODE character 515, thus replacing the user's original input.

Embodiments of the disclosure may retrieve (405) multiple scene identifiers. For example, referring to FIG. 5C, a user may enter as input into an electronic message two scene identifiers, a winking emoji 525 and flying money 530, which is used (in conjunction with the user's retrieved user identifier) to generate (415) a custom graphic of the user's avatar winking while throwing money.

In addition to retrieving UNICODE characters (such as emoji) as scene identifiers, embodiments of the present disclosure may retrieve and analyze text, other images and video to identify a scene identifier. For example, in FIG. 5D, the user enters a surprised emoji 540 and the word "tank" 545, which the system uses to generate a customized graphic of the user's avatar sitting on a tank 550, In other embodiments, the user could insert an image or video of a tank in place of the word "tank," and the system can perform an image recognition analysis of the input to identify the tank and generate the customized graphic 550.

The user identifier may be retrieved (410) from input within the electronic message. For example, the user could input, via the user interface of the user's computing device, his or her name to generate a customized image based on the user's own avatar, as well as text, an image, or video of another individual (e.g., the user's friend) to generate a customized image using the user's friend's avatar. Additionally or alternatively, the user identifier may be retrieved (410) based on information stored within the user's computing device. Any such identifier may be used, such as the user's full name or a username associated with the user. The user identifier may also be an identifier associated with the user's computing device, such as a Unique Device Identifier (UDID) or Identifier for Advertising (IDFA).

Embodiments of the present disclosure may generate (415) the customized graphic according to any other desired criteria, such as the graphic's position in the electronic message. Likewise, presentation (420) of a customized graphic may be based on its size. Referring now to FIG. 5E, a customized graphic that is presented by itself (such as graphic 555) may be displayed relatively larger than a customized graphic that is presented inline as the same size as surrounding text (such as graphic 560) or a graphic presented at the beginning or end of a line of text (such as graphic 565). In some embodiments, the custom graphic may also be displayed as a full image (such as graphic 570), Sizing of a customized graphic may be determined automatically by the system, based on user input, or a combination of the two.

Referring again to FIG. 4A, the electronic message containing the customized graphic may be transmitted (425) over the Internet for distribution to one or more recipients. A computer system performing the functionality method 400 may communicate with any number of other systems and devices, including a server. Such communication may be performed using a variety of different communication protocols and communication mediums, including those described above with reference to network 106. In sonic embodiments, for example, communication with the server may include transmitting an image modified with activity data to a server. In the exemplary system 700 shown in FIG. 7, such communication may be effected using communication module 740.

The electronic message may also be transmitted (425) directly to another user's device, or via another form of network other than the Internet. Additionally, the electronic message, the customized graphic, or both may be presented to the user and/or a recipient for a predetermined period of time, as discussed in more detail above with reference to ephemeral messages.

Figure 4B:
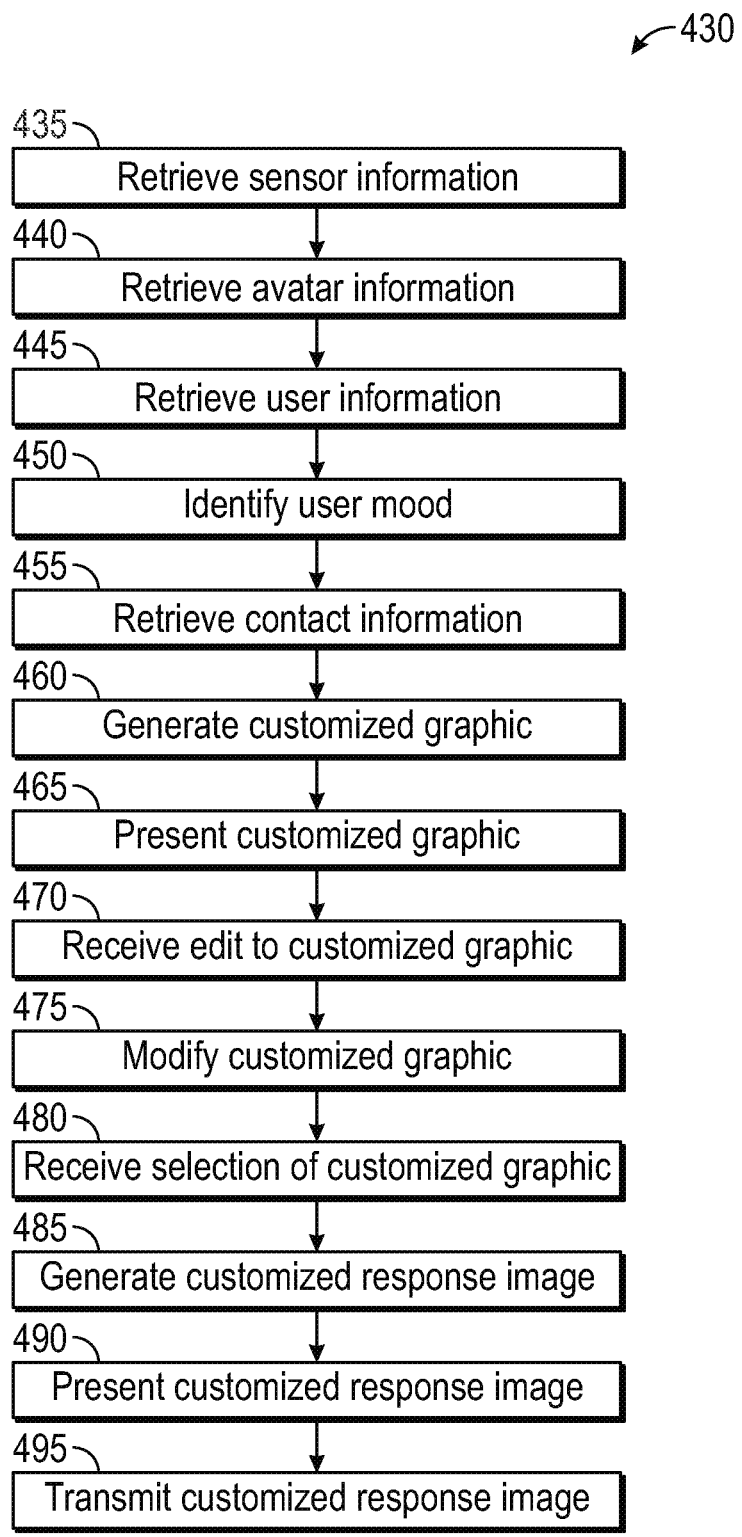

Customized graphics may be generated based on a variety of different information and used in a variety of different applications. FIG. 4B depicts another exemplary process according to various aspects of the disclosure. In this example, method 430 includes retrieving sensor information from a sensor component coupled to a computer system (435), retrieving avatar information associated with a user of the computer system (440), retrieving information regarding the user (445), identifying a mood of the user based on the retrieved user information (450), receiving information for a contact of the user (455), and generating a customized graphic (460). Method 430 further includes presenting the customized graphic (465), receiving an edit to the customized graphic (470), and modifying the customized graphic based on the received edits (475). Method 430 also includes receiving a selection of the customized graphic (480), generating (485) and presenting (490) a customized response image based on the selection, and transmitting the customized response image (495).

In various embodiments, a customized graphic may be generated (460) based on data collected from a variety of sensor components, including (for example) the biometric components 730, motion components 734, environmental components 736, and/or position components 738 described below with reference to FIG. 7, as well as other sensor components. In one exemplary embodiment, the sensor component includes a biometric component for detecting a facial expression of the user of a computing device, and wherein generating the customized graphic (460) includes identifying a mood of the user (450) based on the expression (e.g., happy, sad, excited, etc.) and generating the graphic (e.g., the expression on the face of the user's avatar) based on the identified mood. Such sensor components may be integrated with, or locally coupled to, the computing device used by a user to prepare an electronic message. Additionally or alternatively, such sensor components may be accessed remotely by the computing device over a network (e.g., the Internet).

The system may retrieve avatar information (440) associated with the user of a computing device, contacts of the user, or other individuals. As introduced above, the avatar of a user or individual may be any image resembling or otherwise associated with the user or individual. In addition to images, the retrieved avatar information may include any desired characteristics of the user, such as the user's age, height, weight, interests, preferences (e.g., for clothing), and such characteristics may be used in generating or modifying avatar images of the user/individual. In various embodiments, the avatar information may include any number of different images associated with the user, and generating (460) the customized graphic may including at least a portion of such images within the customized graphic. For example, the user's avatar information (e.g., images of the user's face from different angles and having different expressions) may be used to generate custom images, such as the user riding a tank (FIG. 5E) or kicking a soccer ball (FIG. 5F).

In addition to detecting a user's mood via a biometric component (as described above), the system may identify a user's mood (450) based on information regarding the user that can be retrieved (445) from a variety of sources. Any such information may be retrieved from any desired source, such as a social network entry by the user, a microblog entry by the user, an electronic communication by the user, or other source.

For example, the system may identify such entries over the Internet and perform a keyword search on such entries to identify words indicating the user's mood, such as "sad," "upset," "happy," and the like. Likewise, the system may perform an image recognition analysis of photos posted by the user (e.g., on the user's social network page) and identify facial expressions in a manner similar to the facial recognition analysis used based on the biometric component discussed above. Based on such entries, the system may generate the customized graphic (460) to reflect the user's mood, such as by showing the user's avatar in a graphic frowning in response to determining the user is sad or upset, or showing the user's avatar in a graphic smiling or laughing in response to determining the user is happy or excited. The system may, additionally or alternatively, determine a user's mood based on direct input from the user himself/herself. For example, the user may enter input (e.g., via the input device of the user interface on the user's computing device) to select the user's mood. Such input may take a variety of forms, such as a text description of the user's mood, and/or a graphic the user selects to indicate his/her mood (e.g., a happy face to indicate the user is happy).

In addition to information pertaining to the user of the computer system performing functionality associated with the embodiments of the present disclosure, the system may further retrieve or receive information regarding the user's contacts (455) for use in generating (460) customized graphics. In one exemplary embodiment, a contact of a user is identified as being associated with an electronic message (e.g., as the sender or recipient) and information regarding the contact is retrieved (455) by the system. Such information may be retrieved from the computing device itself (e.g., from an electronic address book) as well as from external sources, such as a social network page associated with the contact (or containing information about the contact—such as from the user's social network page) or the contact's computing device. In some cases, the contact's information may include the contact's own personalized avatar information (e.g., images and characteristics associated with the contact) upon which the system can generate the customized graphic (460) to include a customized avatar image for the contact based on the contact's avatar information. The contact's customized avatar image may be presented (465) to the user as part of the customized graphic and in conjunction with an electronic message. The customized graphic may further be generated (460) based on the content of the electronic message itself. For example, if a user and a contact are engaged in an instant message discussion regarding mountain climbing together, the system could automatically retrieve avatar information for the user (440) and the contact (455) and generate a customized graphic depicting the user and the contact mountain climbing together for insertion into the electronic message. In this manner, embodiments of the present disclosure can greatly improve the functionality of electronic messaging systems by providing dynamic, customized visual content that the user can share with his or her contacts.

The system may also generate the customized graphic (460) based on other information, such as the current time of day, the current date, and event associated with the user or the user's contacts stored in the user's electronic calendar. For example, the system may determine, based on a calendar entry in the user's smartphone or other computing device and geolocation information for the computing device, that the user is currently at a birthday party for one of the user's contacts, and generate a customized image depicting avatars of the user and the user's contact with a birthday cake.

The customized graphic may be presented (465) in a variety of different ways, such as within an electronic message. In some embodiments, referring again to FIG. 5E, the graphic may be displayed alone (images 555 and 570), or in conjunction with text and/or other images (images 560 and 565). In some embodiments, some or all of the customized graphic may be selectable by the user, such as in a hypertext transfer protocol (HTTP) link to content on the Internet, or to initiate a software application of functionality thereof. The customized graphic may also be presented (465) as a selectable icon or link (as discussed below) as well as in conjunction with a media overlay (e.g., a SNAPCHAT filter) and/or or collection of electronic messages (e.g., a SNAPCHAT story). Menus of customized graphics may be presented for selection and inclusion in an electronic message, as shown in the example depicted in FIG. 5G. The customized graphic may also be presented (465) for a predetermined period of time as discussed in more detail above with reference to ephemeral messages.

In one exemplary embodiment, the customized graphic includes a customized avatar of the user or a contact of the user, and the graphic is selectable by the user. In response to receiving a selection (480) of the customized graphic by the user, the system generates a customized response image (485) based on the current mood of user or the user's contact and presents (490) the response image to the user via the display screen of the user's computing device. The user may further select the customized response image to transmit the response image to the contact.

In a particular example of the response image, consider an avatar of the user's contact that it is presented next to the contact's name in the user's address book. The contact's avatar may be dynamically updated to indicate the contact's mood throughout the day. Selecting the avatar image of the user's contact may present information underlying the contact's mood (e.g., "Bob failed his test today" if Bob's avatar appears sad, or "Bob took first place in his race today" if Bob's avatar appears happy). Based on the mood of the contact and/or the underlying information associated with the mood, the system can generate one or more customized response images the user can send to the contact's computing device (alone or in conjunction with an electronic message) by selecting the contact's avatar. For example, the system may generate a generalized "cheer up" response image or a more specific "sorry about the test" response image in response to the first scenario above. Alternatively, the system may generate a generalized "congratulations!" response image or a more specific "congratulations on winning the race!" response image. The response image either may include one or more of the user's avatar image and the contact's avatar image. In some embodiments, a selection of possible response images may be generated and presented to the user, thus allowing the user to select the response image(s) the user feels is most appropriate to give the contact. The response image may be transmitted to the contact's computing device in any desired manner, such as directly to the contact's computing device over the Internet or to a server that reroutes the image to the contact. In this manner, embodiments of the present disclosure enhance the interaction between the user and his/her contacts and provide opportunities for discussion and interaction compared to traditional systems.

Embodiments of the present disclosure may generate (460) and present (465) custom graphics to the user, and receive edits (470) and modify (475) the customized graphic. For example, a customized graphic may be generated and displayed in a menu (as shown in FIG. 5G) of graphics for selection by the user. A user may use the input device of the user interface on the user's computing device to select a customized graphic and apply an edit, such as adding/removing text as well as making graphical edits. Graphical edits may include, for example, adding or removing features from the user's avatar (e.g., adding/removing a hat or mustache to the user's avatar), changing the size or shape of the image, applying graphic effects to the image (shading, stretching, tone, etc.), as well as other edits. The original customized graphic may be permanently modified (475) based on the user input, or saved as a different image for later retrieval by the user.

Software Architecture

Figure 6:
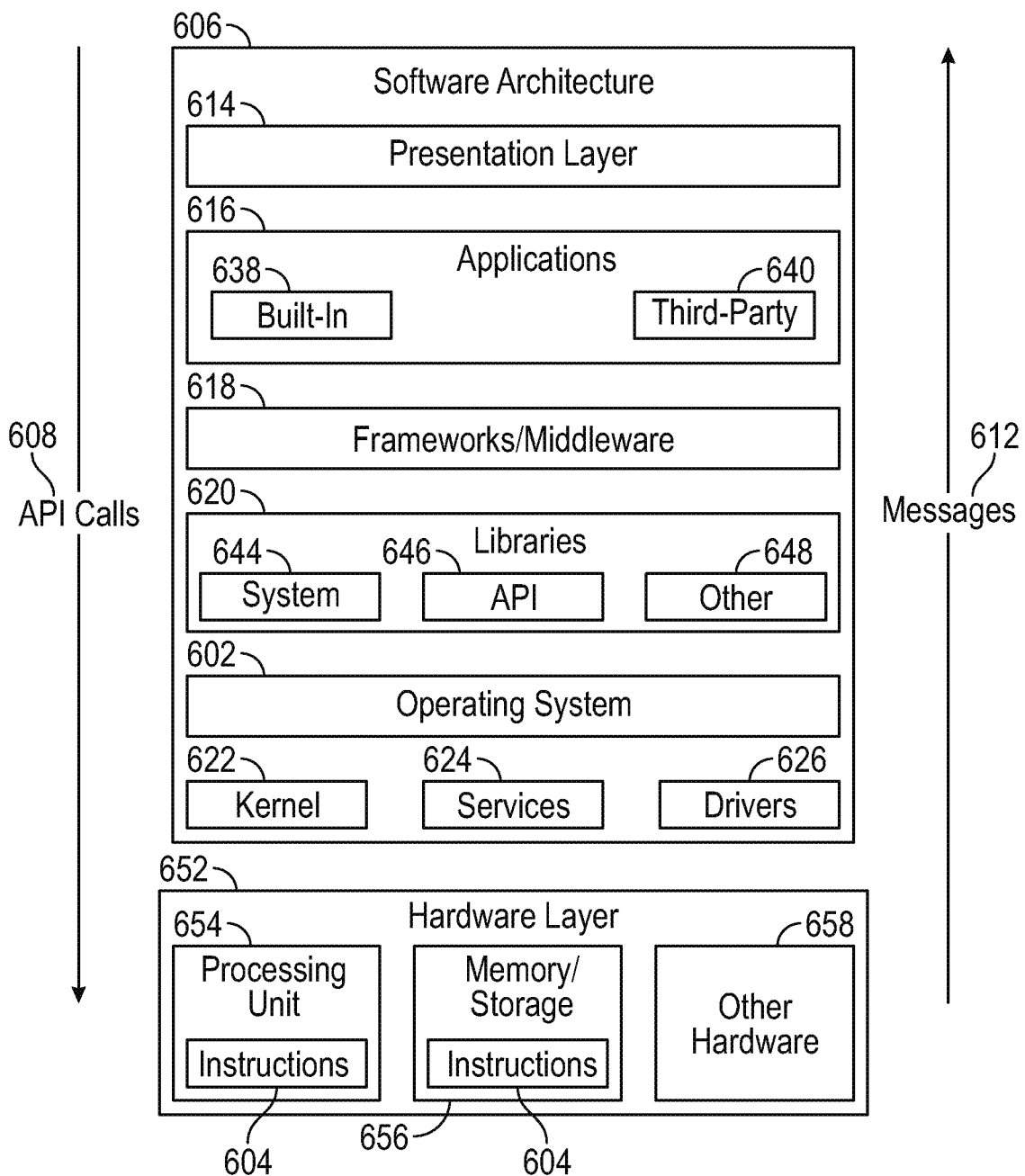
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein, As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL, framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by he applications 616 and/or other software components/modules. For example, the frameworkslmiddleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID or IOS™ software development kit (SDK) by an entity other than the vendor of the particular platform, and may be mobile software running on a mobile operating system such as IOS™, ANDROI™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
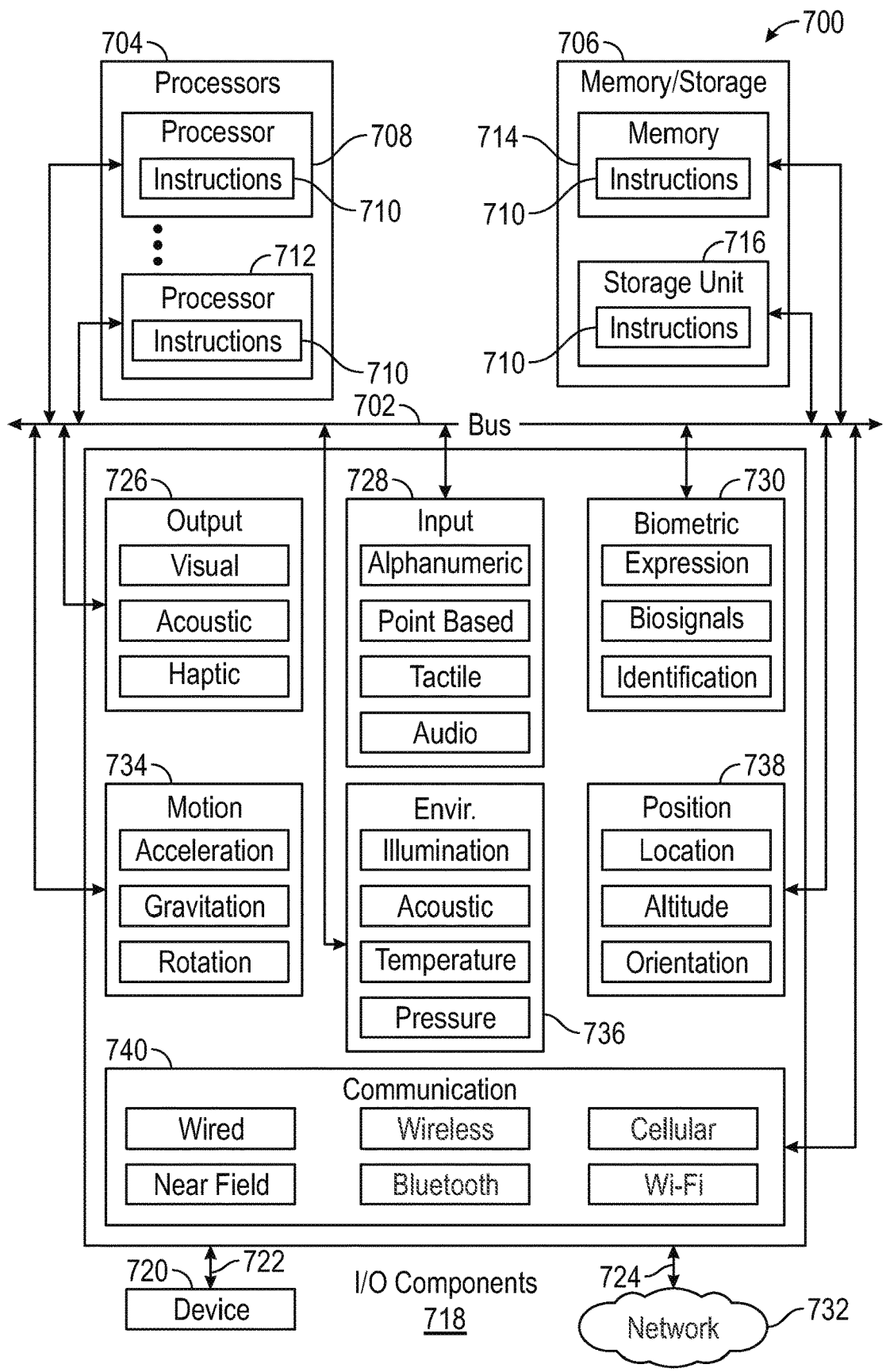
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PG), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 728 may also include one or more image-capturing devices, such as a digital camera for generating digital images and/or video.

in further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers and the like. For example, the location sensor component may provide location information associated with .he system 700, such as the system's 700 GPS coordinates and/or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via. Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and. C may be present in a single embodiment; for example, A and B, A and C, B and C, or A and B and C.

A portion of the disclosure of this patent document contains material that is subject to copyright protection. The copyright owner has no objection to the facsimile reproduction by anyone of the patent document or the patent disclosure, as it appears in the Patent and Trademark Office patent tiles or records, but otherwise reserves all copyright rights whatsoever. The following notice applies to the software and data as described below and in the drawings that form a part of this document: Copyright 2016, SNAPCHAT, INC. 2016, All Rights Reserved.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
a processor; and
a memory coupled to the processor and storing instructions that, when executed by the processor, cause the system to perform operations comprising:
receiving, via a user interface, an input requesting a menu of graphics;
retrieving a user identifier for a user associated with the system;
generating the menu of graphics comprising a plurality of customized graphics based on the user identifier, wherein at least one of the plurality of customized graphics comprises an avatar that is personalized to a user identified by the user identifier; and
causing the menu of graphics to be displayed on a display screen of the user interface.

2. The system of claim 1, wherein the operations further comprising:
receiving, via the user interface, an input selecting, from the menu of graphics, a first customized graphic included in the plurality of customized graphics; and
causing the first customized graphic to be displayed in the menu of graphics on the display screen of the user interface.

3. The system of claim 2, wherein causing the first customized graphic to be displayed includes causing the first customized graphic to be displayed as a response to an electronic message displayed on the display screen of the user interface.

4. The system of claim 1, wherein the operations further comprising:
receiving, via the user interface, content for an electronic message comprising a scene identifier for a graphic; and
generating a first customized graphic based on the scene identifier and the user identifier, wherein the first customized graphic is included in the plurality of customized graphics.

5. The system of claim 4, wherein the operations further comprising:
receiving, via the user interface, an input selecting the first customized graphic; and
causing the first customized graphic to be displayed within the electronic message on the display screen of the user interface.

6. The system of claim 4, wherein the scene identifier for the graphic further includes:
a text, an image, or a video.

7. The system of claim 4, wherein the electronic message comprises a plurality of scene identifiers, and wherein the first customized graphic is generated based on the user identifier and the plurality of scene identifiers.

8. The system of claim 4, further comprising a communication module coupled to the processor, wherein the memory further stores instructions for transmitting the electronic message including the customized graphic to a server over a network.

9. The system of claim 1, wherein retrieving the user identifier includes analyzing text entered within the electronic message.

10. The system of claim 1, wherein retrieving the user identifier includes analyzing one or more identifiers associated with the user stored within the memory of the system.

11. A method comprising:
receiving, by a processor of a system, via a user interface, an input requesting a menu of graphics;
retrieving a user identifier for a user associated with the system;
generating the menu of graphics comprising a plurality of customized graphics based on the user identifier, wherein at least one of the plurality of customized graphics comprises an avatar that is personalized to a user identified by the user identifier; and
causing the menu of graphics to be displayed on a display screen of the user interface.

12. The method of claim 11, further comprising:
receiving, via the user interface, an input selecting, from the menu of graphics, a first customized graphic included in the plurality of customized graphics; and causing the first customized graphic to be displayed in the menu of graphics on the display screen of the user interface.

13. The method of claim 12, wherein causing the first customized graphic to be displayed includes causing the first customized graphic to be displayed as a response to an electronic message displayed on the display screen of the user interface.

14. The method of claim 11, further comprising:
receiving, via the user interface, content for an electronic message comprising a scene identifier for a graphic; and
generating a first customized graphic based on the scene identifier and the user identifier, wherein the first customized graphic is included in the plurality of customized graphics.

15. The method of claim 14, further comprising:
receiving, via the user interface, an input selecting the first customized graphic; and
causing the first customized graphic to be displayed within the electronic message on the display screen of the user interface.

16. The method of claim 14, wherein the scene identifier for the graphic further includes:
a text, an image, or a video.

17. The method of claim 14, wherein the electronic message comprises a plurality of scene identifiers, and wherein the first customized graphic is generated based on the user identifier and the plurality of scene identifiers.

18. The method of claim 14, further comprising:
transmitting the electronic message including the customized graphic to a server over a network.

19. The method of claim 11, wherein retrieving the user identifier includes at least one of:
analyzing text entered within the electronic message, or
analyzing one or more identifiers associated with the user stored within a memory of the system.

20. A non-transitory computer-readable medium storing instructions that, when executed by a processor, cause the processor to perform operations comprising:
receiving, via a user interface, an input requesting a menu of graphics;
retrieving a user identifier for a user associated with the system;
generating the menu of graphics comprising a plurality of customized graphics based on the user identifier, wherein at least one of the plurality of customized graphics comprises an avatar that is personalized to a user identified by the user identifier; and
causing the menu of graphics to be displayed on a display screen of the user interface.

* * * * *